A. BLATCHLY.
Improvement in Mode of Operating Rock-Drills.
No. 127,548.                Patented June 4, 1872.
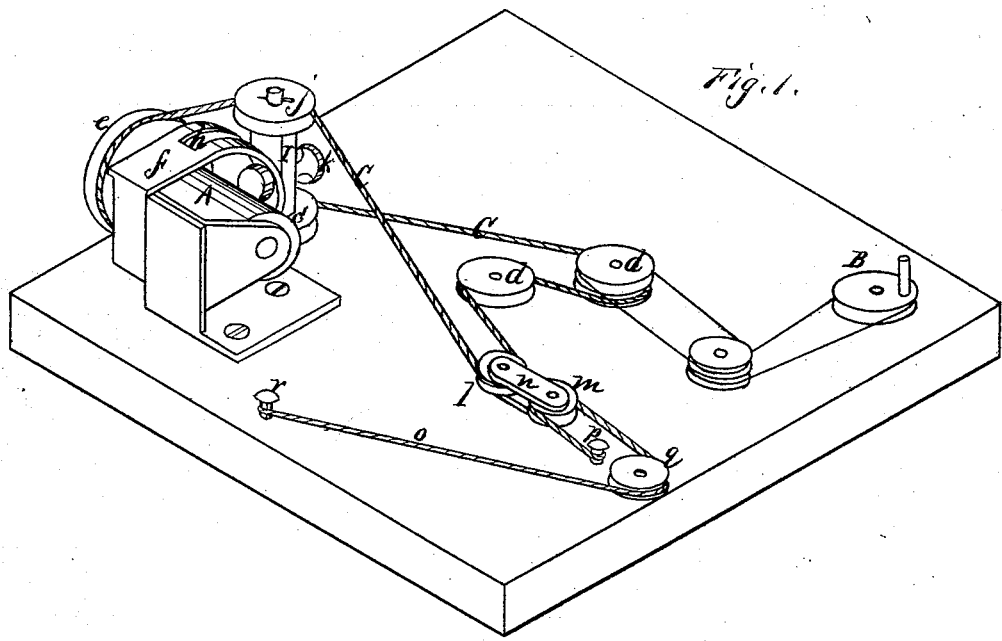
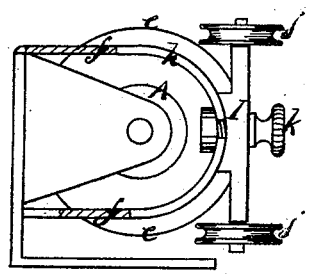

UNITED STATES PATENT OFFICE.

AMBROSE BLATCHLY, OF SAN FRANCISCO, CALIFORNIA.

IMPROVEMENT IN THE MODE OF OPERATING ROCK-DRILLS.

Specification forming part of Letters Patent No. 127,548, dated June 4, 1872.

SPECIFICATION.

*To all whom it may concern:*

Be it known that I, AMBROSE BLATCHLY, of the city and county of San Francisco, State of California, have invented improvements in Operating Rock-Drills; and I do hereby declare the following description and accompanying drawing are sufficient to enable any person skilled in the art or science to which it most nearly appertains to make and use my said invention or improvements without further invention or experiment.

My invention relates to an improved arrangement for operating rock-drills in tunnels and other contracted positions where it is necessary for the want of space to locate the motive power at a distance from the machine and transmit the power by suitable means to it; and it consists, first, in the employment of an endless wire-rope for transmitting the power; and secondly, in a novel arrangement of pulleys whereby the rope is rendered effective and its use convenient for transmitting the power to the drill. In order to more fully illustrate and explain my invention, reference is had to the accompanying drawing, forming a part of this specification, in which—

Figure 1 is a plan. Fig. 2 shows the pulley arrangement for guiding the ropes.

For the purpose of this description I have represented my invention as applied to the rock-drilling machine, for which Letters Patent have been granted to me.

A represents the cam-cylinder which, by its revolution, conveys to the drill-rod a reciprocating motion. B represents the motive power, which can be stationed outside of the mine, or at any required distance from the drill. In order to transmit the power to the cam-cylinder A, I employ an endless wire-rope, C, and employ double pulleys $d\ d$ at the angle of the tunnel or other passage, in order to change the direction of the rope. A pulley, $e$, is fixed upon the journal of the cam-cylinder A, and a yoke or semicircular metallic band, $f$, is attached to the frame of the machine so as to partially encircle the cylinder. This yoke or band has a longitudinal slot, $h$, which should extend nearly around the upper half of the cylinder. A bar, I, has a journal at each end, upon each of which is a pulley, $j$. This bar is placed so as to rest upon the yoke $f$, and is secured to it through the slot $h$, by means of a set-screw, $k$, or equivalent device. The wire-rope, after passing from the last ground pulley $l$, passes over one of the pulleys $j$, thence around the pulley $e$, and then over the pulley $j$ on the opposite side of the bar I. The pulleys $j$ thus act as spacing pulleys, and hold the rope in the proper position to cause it to drive the pulley $e$. By this arrangement of pulleys it is obvious that a slight adjustment of the bar I, in the slot $h$, will permit the working position of the drilling-machine to be changed to any desired direction, by causing the pulleys $j$ to direct the rope around the pulleys $e$.

In order to avoid the delay and trouble consequent on moving the machine in keeping it forward to its work, I carry the rope C out of its course at some convenient point between the drill and power, and pass it around a pulley, $l$. This pulley and another, $m$, are secured at the opposite ends and between two plates, $n$. A rope, $o$, has one end permanently secured to some object, $p$, and passes around the opposite pulley $m$, then around a pulley, $q$, from which it can be carried to a stake, $r$, and there secured. Now, when it is necessary to move the drill forward, the rope $o$ can be let out as far as required to produce the necessary slack of the endless wire-rope, and again secured.

By this means I provide a cheap, convenient, and thoroughly reliable means of driving rock-drilling machines in tunnels, or in other confined positions.

Having thus described my invention, what I claim and desire to secure by Letters Patent, is—

1. The slotted semicircular band or yoke $f$, in combination with the adjustable-bar I, with its pulleys, $j$, substantially as and for the purpose above described.

2. The adjustable-pulleys $j$, in combination with the pulley $e$, substantially as and for the purpose above described.

3. The pulleys $m\ m$ attached as described, in combination with the endless wire-rope C, and compensating-rope $o$, substantially as and for the purpose above described.

4. The endless wire-rope C, when employed in combination with pulleys $d\ e\ j\ j\ m$, for the purpose specified.

In witness whereof I hereunto set my hand and seal.

A. BLATCHLY. [L. S.]

Witnesses:
  C. M. RICHARDSON,
  J. L. BOONE.